J. PFEIFER.
HOUSEHOLD-UTENSIL.
No. 172,341.    Patented Jan. 18, 1876.
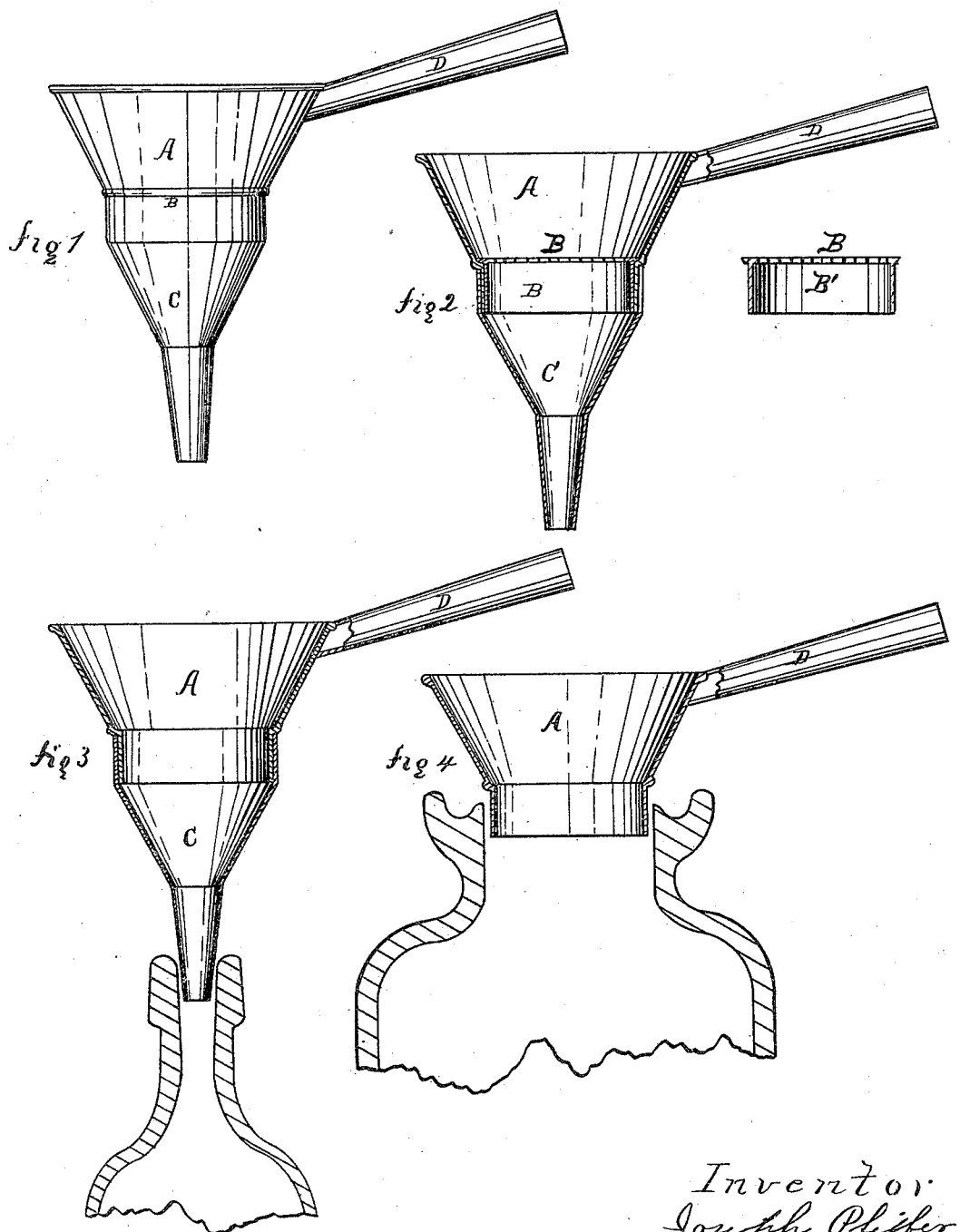

UNITED STATES PATENT OFFICE

JOSEPH PFEIFER, OF PITTSBURG, PENNSYLVANIA.

IMPROVEMENT IN HOUSEHOLD UTENSILS.

Specification forming part of Letters Patent No. 172,341, dated January 18, 1876; application filed November 2, 1875.

*To all whom it may concern:*

Be it known that I, JOSEPH PFEIFER, of Pittsburg, in the county of Allegheny and State of Pennsylvania, have invented a new and useful Improvement in Household Utensils; and I do hereby declare that the following, is a full and exact description thereof, reference being had to the accompanying drawings, and to the letters of reference marked thereon.

My invention relates to an improvement in combined funnels and strainers; and it consists in a utensil composed of three removable parts, capable of the several adjustments and uses hereinafter specified.

To enable others skilled in the art to make and use my invention, I will proceed to describe its construction and operation.

In the accompanying drawings, which form part of my specification, Figure 1 is a side elevation of my improvement. Fig. 2 is a vertical section of the same. Fig. 3 is a vertical section representing it as a bottle-filler with strainer removed. Fig. 4 is a vertical section representing it as a can-filler, with strainer removed.

In the accompanying drawings, A represents that part of the utensil which, when furnished with the perforated disk B, having an annular flange, B', serves the purpose of a strainer for coffee, tea, and other things. Removing the part B B', it serves the purpose of a can-filler, as indicated in Fig. 4. The parts A and C being united, it answers the purpose of a funnel having a strainer, as indicated in Fig. 2. Removing the part B B', it may be used as an ordinary funnel for filling bottles, as indicated in Fig. 3. D represents the handle, which is secured to the part A, as indicated in the accompanying drawings. The part or strainer B B' may be constructed of wire-cloth, the periphery of it being secured in a sheet-metal flange.

By constructing a vessel as hereinbefore described it will serve a variety of purposes for household use, such as straining coffee and tea, filling fruit-cans and bottles, and altogether forming a very useful, convenient, and a desirable household utensil.

Having thus described my improvement, what I claim is—

The herein-described improvement in funnels and strainers, consisting of the removable section A D, and independent perforated disk B, with flange B', constructed to fit together, in combination with funnel C, and capable of the several uses herein specified.

JOSEPH PFEIFER.

Witnesses:
A. C. JOHNSTON,
CHAS. V. KRUGH.